(12) United States Patent
Haddadin et al.

(10) Patent No.: US 10,357,886 B2
(45) Date of Patent: Jul. 23, 2019

(54) JOINT DEVICE

(71) Applicant: FRANKA EMIKA GmbH, München (DE)

(72) Inventors: Sami Haddadin, Hannover (DE); Björn Pietsch, München (DE); Tim Rokahr, München (DE)

(73) Assignee: FRANKA EMIKA GmbH, Munich (DE)

( * ) Notice: Subject to any disclaimer, the term of this patent is extended or adjusted under 35 U.S.C. 154(b) by 0 days.

(21) Appl. No.: 15/765,037

(22) PCT Filed: Sep. 23, 2016

(86) PCT No.: PCT/EP2016/072649
§ 371 (c)(1),
(2) Date: Mar. 30, 2018

(87) PCT Pub. No.: WO2017/055180
PCT Pub. Date: Apr. 6, 2017

(65) Prior Publication Data
US 2018/0272545 A1 Sep. 27, 2018

(30) Foreign Application Priority Data
Sep. 30, 2015 (DE) .................. 10 2015 116 609

(51) Int. Cl.
*B25J 19/00* (2006.01)
*H02P 3/12* (2006.01)
*H02P 3/22* (2006.01)
*H02P 29/00* (2016.01)
(Continued)

(52) U.S. Cl.
CPC ............ *B25J 19/0004* (2013.01); *H02P 3/12* (2013.01); *H02P 3/22* (2013.01); *H02P 29/0022* (2013.01);
(Continued)

(58) Field of Classification Search
CPC . G05B 19/19; G05B 11/01; G05B 5/01; B25J 5/00; H02K 7/10; H02K 17/32;
(Continued)

(56) References Cited

U.S. PATENT DOCUMENTS 4,816,955 A * 3/1989 Bruns .................... B23Q 16/04
200/47
5,327,055 A * 7/1994 Danielson ................. H02P 3/04
318/366
(Continued)

FOREIGN PATENT DOCUMENTS

DE 102007059492 A1 6/2009
DE 102008021671 A1 11/2009
(Continued)

OTHER PUBLICATIONS

Lumineau, Stéphane; PCT/EP2016/072649; International Search Report; ISA/EPO; dated Jan. 1, 2017.
(Continued)

*Primary Examiner* — Antony M Paul
(74) *Attorney, Agent, or Firm* — Nexsen Pruet, LLC; Todd A. Serbin

(57) ABSTRACT

The invention relates to a joint device, comprising an electric motor, an electrically controllable blocking apparatus), various control apparatuses, and a brake system, in the case of which brake system, in various alternatives, the brake system takes maximum energy from the system by means of active closed-loop/open-loop control or by triggering a (cycled) short circuit whenever possible and only triggers the mechanical blocking as a last resort in order to protect the mechanical and electrical system itself, but nevertheless ensures that the system is securely shut down after a maximum time.

19 Claims, 1 Drawing Sheet

(51) Int. Cl.
*H02P 29/024* (2016.01)
*H02P 3/16* (2006.01)
*H02P 3/26* (2006.01)
*F16D 63/00* (2006.01)

(52) U.S. Cl.
CPC ........ *H02P 29/024* (2013.01); *H02P 29/0241* (2016.02); *F16D 63/006* (2013.01); *H02P 3/16* (2013.01); *H02P 3/26* (2013.01)

(58) Field of Classification Search
CPC ... H02K 23/68; H02P 3/00; H02P 3/04; H02P 3/06; H02P 3/065; H02P 3/12; H02P 3/16; H02P 3/18; H02P 3/22; H02P 3/26; H02P 8/24; H02P 23/00; H02P 27/00; H02P 27/04; H02P 27/06; H02P 29/04
USPC ....... 318/612, 614, 134, 703, 741, 757, 759, 318/765, 273, 362, 568.11, 568.12; 901/15, 19, 23, 27, 28, 29, 30, 32, 38; 70/277, 280, 287; 440/74; 73/379.06
See application file for complete search history.

(56) References Cited

U.S. PATENT DOCUMENTS

| 8,410,732 B2 | 4/2013 | Kassow et al. |
| 2008/0150459 A1 | 6/2008 | Heidelberger |

FOREIGN PATENT DOCUMENTS

| DE | 102013013875 A1 | 2/2015 |
| DE | 102014222678 A1 | 5/2016 |
| EP | 1857229 A1 | 11/2007 |
| EP | 3017917 A2 | 5/2016 |
| JP | H01308200 A | 12/1989 |

OTHER PUBLICATIONS

Schmid, Christoph; DE Examination Report; DE 10 2015 116 609.7; dated Jul. 13, 2016.

\* cited by examiner

JOINT DEVICE

RELATED APPLICATIONS

This application is a U.S. national phase application, claiming priority under 35 U.S.C. 371 to PCT application PCT/EP2016/072649, filed on Sep. 23, 2016, claiming priority to German national application 10 2015 116 609.7, filed on Sep. 30, 2015, the contents of the these applications incorporated by reference as if fully set forth herein in their entirety.

FIELD AND BACKGROUND OF THE INVENTION

The present invention relates to the robotics industry.

U.S. Pat. No. 8,410,732 B2 describes how a brake device, in case of power loss, for example, is engaged, and then a braking takes place, until a stopping by means of friction takes place. The device requires a plurality of mechanical components and the setting of the same, and the maximum braking time depends on the friction and varies with time, so that it is not completely defined.

BRIEF DESCRIPTION OF THE DRAWINGS

In particular.

DETAILED DESCRIPTION OF EMBODIMENTS OF THE INVENTION

Figure 1:
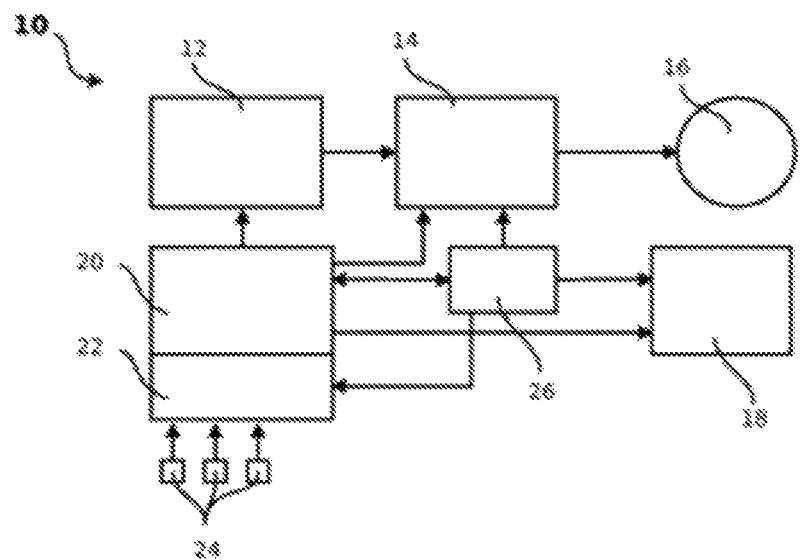
FIG. 1 shows a schematic representation of the inventive assembly.

The present invention refers to a joint device, which comprises an electric motor for achieving a relative motion between a joint driving side and a joint driven side, a motor control device and a brake device.

The object of the invention is thus to brake the joint driven side until a stopping takes place, by means of a constructively simplified joint device in all conditions of use, within a defined period of time, or to provide a corresponding braking method.

This object is achieved by the characteristics set forth in claim 1 or 13. Advantageous embodiments are provided in the dependent claims. The basic idea of the invention is to always extract the maximum energy, when possible, from the system by means of an active closed loop/open loop control or by triggering a short-circuit and to only trigger a mechanical blocking, as a last resort, in order to protect the mechanical system itself, while ensuring that the system is securely shut down after a determined maximum time.

The inventive joint device, characterized by less mechanical parts than in the embodiment according to above mentioned document, is less prone to errors and less prone to wear. The inventive joint device is more compact and flat and has a slightly reduced weight. No degrading braking disc is required and there is no need to set the correct wear for a corrugated spring washer during mounting. Thus, there is no dependence from wear or a wear coefficient, its temperature dependency, and changes over time.

The invention proposes a brake system, in which, depending on the criticality of determined faults or errors, the brake system extracts the maximum possible energy from the system, while in case of faults, within a predetermined dead time, the system is securely shut down. The alternatives for shutting down the system have essentially three different probabilities of occurrence: the first alternative (the normal braking process) is the most frequent. The second and third alternative are considerably less frequent since they only occur in case of faults. The rarest alternative is the fourth alternative, which only takes place in case of a non-detected electrical fault or, for example, in case of an intermediate short-circuit.

The starting point and the normal case is the normal braking process, i.e., when the control unit in the first alternative detects that no faults or at least no security-critical faults have been signaled by the operating state detecting device, and the motor control device is thus controlled by the control unit in order to brake the electric motor. The control takes place by a modification, preferably a reduction, inversion or a combination of these modifications of the current supplied to the electric motor. When the braking process is concluded, and thus the joint device is stopped, the locking device according to an advantageous embodiment may be engaged, in order for the joint device to be prevented from moving further due to its own weight or other external influences.

If the operating state detecting device detects faults external to the control unit, in particular faults which are critical for security, then in a second alternative, the control unit is controlled by the motor control device for braking the electric motor and at a subsequent time, however at the latest after a predetermined dead time, the locking device is transferred into the locking position. The second alternative is used, for example, in case of consistency errors of the sensor device signals, if the joint is at an unexpected position, while a voltage drop is detected, an unexpected torque, an unexpected motor speed, or a temperature overshooting. In such a case, the engagement of the emergency locking system (the locking device) is initiated. The defined dead time until engagement by the locking device is used in order to extract energy from the system by means of an active motor control. At the latest after the dead time, the system is securely brought into a stopped condition—by previous active braking of the motor control it is ensured, at the same time, that the mechatronic system is subject to maximum protection. According to an advantageous embodiment, in the second alternative, the control unit controls the motor control device in order to provide a short circuit or a combination of a braking and a short circuit of the electric motor.

The sensor devices are sensors, for example, which are positioned within or without the joint for measuring the joint positions, the torques, the temperature or the motor speed, or even other sources such as self-diagnostic devices or a global master controller.

If, however, the motor connection control unit determines that the control unit is faulty, in a third alternative, the motor connection device is set by the motor connection control unit into a short circuit condition and at a later time, at the latest however after a predetermined dead time, the locking device turns into the locking position. The motor connection control unit may detect a faulty control unit in that it receives a signal, normally sent by the control unit, at an unexpected point in time. The content of this signal may also be checked by means of a control computation in order to verify its correctness.

The described dead times are at least 10 ms and typically, depending on masses and the motor size, lie between 50 ms and 200 ms. Due to the short-circuit condition, due to counter-induction, a braking of the electric motor takes place, and, if, after the dead time, the electric motor or the joint device is still in motion, the locking device forces a sudden stop. Since the dead time is selected so that the electric motor is essentially braked, the forces caused by the sudden stop remain acceptably low. The short circuit is used for extracting energy from the system, in order to obtain a self-protection of the mechanical part. According to advantageous embodiments, the respective subsequent time may be already reached before the expiration of the dead time, when the electric motor drops below a predetermined residual speed, so that the system is braked still faster.

In a fourth alternative, a current fault is present but is not detected. In this case, the locking device, due to a lack of energy supply, automatically falls into the locking position. A first possibility for this operating state is a short-circuited supply cable to the robot or joint. No voltage can be detected anymore since no voltage is returned from the electric motor. A further case is a fault in the primary main supply, in which such a fault is sometimes not recognized, or where the stop signal cannot be transferred with a sufficient speed.

An essential aspect or advantage of this inventive sequence is the fail-safe function: the mechanical locking device (brake) always engages, either due to an active control, after expiration of dead time or in case of an undetected power supply fault.

According to an advantageous embodiment of the invention, the motor connection device cyclically short-circuits the electric motor. The cycling causes a protection of the electronics, since high currents, which may be caused by induction of an uncycled short-circuit, are reduced. Preferably a short value is provided at high speed, while longer lasting values are provided at slowing speeds. The cycling is advantageously in the same order of magnitude of the cycling of the motor control. The short-circuit cycling is preferably at 40 kHz.

According to an advantageous embodiment of the invention, it comprises an energy buffering device. The entire system (such as a robot with at least one such joint device) preferably has an expanded power supply, which allows energy buffering. If no current flows into the power supply, the system and its joint devices may still be shortly powered by electric current. The system main control unit may thus send a braking signal to all joint units, as soon as it detects, by means of an input voltage control on the power supply, that no current is flowing into the power supply anymore.

According to an advantageous embodiment, in a fifth alternative, a power fault is detected, and the motor connection control unit controls the motor control device for braking the electric motor and at a subsequent time, however at the latest after the expiration of a dead time, it sets the locking device into the locking position. A power fault is here present in case of an interrupted power supply thus without a short-circuit. If the electric motor is still moving, energy is still provided from it to the electronics, and this energy may be still used by the electronics for regulating the motor, while still holding the locking device in the release position. If the electric motor is stopped, on the other hand, a motor adjustment is impossible but also unnecessary, since the motor is not to be braked anymore before the locking device falls into the locking position. This alternative in particular is present when the primary main supply fails, this fault is detected, in particular by a main control unit and a signal is sent preferably from the main control unit to the joint device, so that the latter, as described, performs a controlled braking in this operating state and then moves the locking device into the locking position.

The fifth alternative has the same occurrence probability as the second and third alternative. Its object is also to extract energy from the system, in abnormal cases, before the mechanical energy collapses.

The locking device is preferably formed by a star wheel.

A gearbox is preferably disposed behind the electric motor and the locking device. The joint device obtains a clearance between the prongs, due to the use of a braking star. If a gearbox is provided behind the electric motor and the locking device, the clearance is reduced on the driven side. This effect is important since the clearance sums up through the joints and forms an end effector (such as a robot). Additionally, the mechanical system is protected by the gearbox itself. It is to be noted that this effect occurs in particular in the lower axes, since there a lower force is applied to the star wheel due to the gearbox, since it is a decoupled effect. In the context of the security concept, the gearbox is provided in such a way that it cannot fail due to idle rotation, since it blocks instead.

Further advantages, characteristics, and details are obtained from the following description, in which—possibly by reference to the drawing—at least one exemplary embodiment is described in detail. Equal, similar, and/or functionally equal parts are provided with the same reference numbers.

As shown in FIG. 1, the joint device 10 comprises a motor control device 12, which is adapted for supplying energy through a motor connection device 14 to an electric motor 16 or for extracting energy from the same. The motor connection device 14 is adapted for allowing the energy exchange between the motor control device and the electric motor in the normal state, while short-circuiting the electric motor 16 permanently or in a pulsed manner in a short-circuit state.

Moreover, a mechanical acting, electrically controllable locking device 18 is comprised, which in a locking position without energy supply, blocks any relative motion between a joint drive side, not shown, and a joint drive side, not shown, through form-fit, and in a release position with energy supply, releases this relative motion. The locking device 18 is shown in further detail in FIG. 2.

A control unit 20 is adapted for controlling the motor control device 14 and the locking device 18 depending on different alternatives, in such a way, that the joint device 10 is stopped. To this end, the control unit 20 comprises an operating state-detecting device 22, which is connected with a number of sensor devices 24 and is adapted for detecting different operating states.

A motor connection control unit 26 is adapted for controlling the motor connection device 14 and the locking device 18 depending on different alternatives in such a way that the joint device 10 is stopped. To this end, the control unit 20 regularly provides the motor connection control unit 26 with signals: if at the expected time no or a faulty signal comes in, then the motor connection control unit is set in the short-circuit state, in the third alternative, and at a subsequent time, at the latest however after a predetermined dead time, the locking device 18 is set into the locking position.

Figure 2:
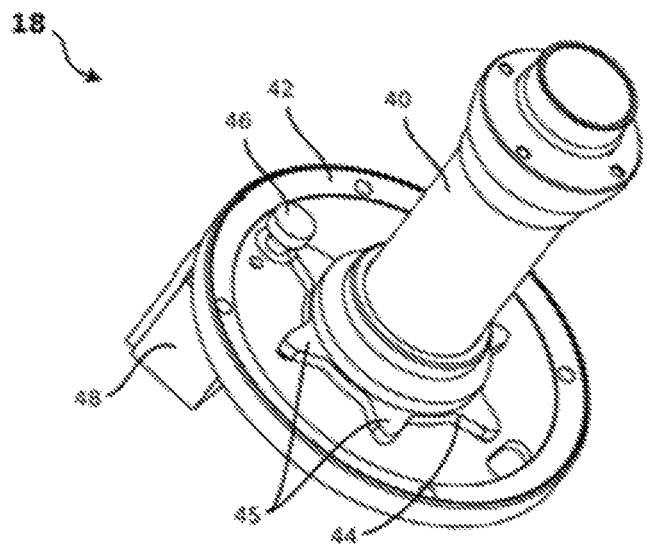
FIG. 2 shows a perspective representation of a locking device.

In FIG. 2, the locking device 18 is shown in a perspective view. It comprises a drive shaft 40 and a bearing disc 42, fixed to the housing, which supports the drive shaft 40 through bearings, not shown. On the drive shaft 40 a star wheel 44 with a plurality of prongs 45 is fixed, which rotates therewith. On the stationary bearing disc 42 a head bolt 46 with a radially enlarged head is positioned, which, through a magnet actuating device housed in housing 48, not shown in detail, may be moved between a locking position, which it has without energy supply, and a release position, reached in case of energy supply. In the release position shown in FIG. 2, the head of the head bolt 46 is positioned in the axial direction out of engagement with the prongs 45 of the star wheel 44. In case of energy shutdown, the head bolt 46 is pulled, by spring force, in the direction of the bearing disc 42 and thus moves between neighboring prongs 45 of star wheel 44. Thus, an abrupt braking of the drive shaft 40 takes place as soon as the following prong 45 collides with the head of the head bolt 46.

If the head of the head bolt 46 is positioned above a prong 45 at the time of power deactivation, it slides, due to spring force, completely downwards as soon as the star wheel and thus the prong 45 has moved further.

The described locking device allows for a manual aeration. If the joint device is enclosed by an enclosure, the latter has to be provided with a corresponding aperture.

At least one prong 45 is required, preferably at least two, in order to obtain a symmetry on the drive shaft 40, in order to avoid an imbalance. Preferably 5 or 6 prongs 45 are provided. The higher the number, the larger the chance of hitting a prong 45, but also the faster a prong 45 will hit on a head bolt 46.

The points of the prongs 45 are preferably pointed. The inclination of the points allows only a part of the force when hitting on the head bolts 46 to be used for deflecting the prong 45, which is used as a flection plank, while another part is led along the plank. The inclination is ideally equal to an angle of 30°-60°, in particular 45°.

Although the invention has been illustrated and explained in further detail by means of preferred exemplary embodiments, it should be noted that the invention is not limited to the disclosed examples and that other modifications may be deduced by those skilled in the art, without departing from the scope of the invention. It is thus evident that a multitude of possible variants exist. It is also evident that the exemplary embodiments represent just examples, which should not be construed in any way as limitations of the protection scope, of the application possibilities, or the configuration of the invention. The previous description and the description of figures provide those skilled in the art with a means for concretely putting the embodiments into practice, wherein the skilled in the art, based on the knowledge of the disclosed inventive idea, may introduce many modifications, such as regarding the function or the disposition of individual elements, which are cited in an exemplary embodiment, without abandoning the scope of the invention, which is defined by the claims and their legal equivalents, such as more detailed explanations within the description.

The invention claimed is:

1. A joint device having the following characteristics:
   an electric motor for providing a relative motion between a joint drive side and a joint driven side,
   a motor control device, which is adapted for supplying energy to the electric motor or for extracting energy therefrom;
   a motor connection device, which is adapted for allowing, in the normal state, the energy exchange between the motor control device and the electric motor, without influencing the same, while permanently or pulsatingly short-circuiting the electric motor in a short-circuit state,
   a mechanical functioning, electrically controllable locking device, which in a locking position without energy supply, blocks a relative motion between the joint drive side and the joint driven side, by form-fit, and which, in a release position, with energy supply, releases this relative motion,
   a control unit, which is adapted for controlling the motor control device, the motor connection device and the locking device depending on different operating states in such a way that the joint device may be stopped,
   a motor connection control unit, which is adapted for controlling the motor connection device and the locking device in different ways, so that the joint device may be stopped,
   the control unit comprises an operating state detecting device, which is connected with a number of sensor devices and which is adapted for detecting different operating states,
   wherein the joint device is adapted for obtaining its shutting down by following alternative methods:
   if the control unit in a first alternative does not detect any fault, then the motor control device is used for braking the electric motor,
   if the operating state detecting device detects faults outside of the control unit, in a second alternative, the control unit controls the motor control device for braking the electric motor and at a subsequent time, at the latest though after a predetermined dead time, sets the locking device into the blocking position,
   if the motor connection control unit determines that the control unit is in a faulty condition, in a third alternative, the motor connection device is set into a short-circuit state and at a subsequent time, at the latest though after a predetermined dead time, it sets the locking device into the blocking position,
   if a power supply failure occurs, but cannot be detected, in a fourth alternative, the locking device is set into the blocking position, due to a lack of energy supply.

2. The joint device of claim 1, characterized in that in the first alternative, after the shutting down of the electric motor, the locking device may be switched into the blocking position.

3. The joint device of claim 2, characterized in that the subsequent time in the second alternative is reached already before expiration of the dead time, when the electric motor drops below a predetermined residual speed.

4. The joint device of claim 3, characterized in that the subsequent time in the third alternative is reached already before expiration of the dead time, when the electric motor drops below a predetermined residual speed.

5. The joint device of claim 3, characterized in that in the second alternative, the control unit controls the motor control device in order to perform a short-circuit or a combination of a braking and a short-circuit of the electric motor.

6. The joint device of claim 4, characterized in that in the second alternative, the control unit controls the motor control device in order to perform a short-circuit or a combination of a braking and a short-circuit of the electric motor.

7. The joint device of claim 2, characterized in that the subsequent time in the third alternative is reached already before expiration of the dead time, when the electric motor drops below a predetermined residual speed.

8. The joint device of claim 2, characterized in that in the second alternative, the control unit controls the motor control device in order to perform a short-circuit or a combination of a braking and a short-circuit of the electric motor.

9. The joint device of claim 1, characterized in that the subsequent time in the second alternative is reached already before expiration of the dead time, when the electric motor drops below a predetermined residual speed.

10. The joint device of claim 1, characterized in that the subsequent time in the third alternative is reached already before expiration of the dead time, when the electric motor drops below a predetermined residual speed.

11. The joint device of claim 1, characterized in that in the second alternative, the control unit controls the motor control device in order to perform a short-circuit or a combination of a braking and a short-circuit of the electric motor.

12. The joint device of claim 1, characterized in that the motor connection device cyclically short-circuits the electric motor.

13. The joint device of claim 1, characterized in that the cycling is performed within the frequency range of the cycling of the motor control.

14. The joint device of claim 1, characterized in that the joint device or the entire system comprises an energy buffer device.

15. The joint device of claim 1, characterized in that a fifth alternative is provided, wherein an electric fault may be detected, and the control unit controls the motor control device for braking the electric motor and at a subsequent time, at the latest though after a predetermined dead time, it sets the locking device into the blocking position.

16. The joint device of claim 15, characterized in that the subsequent time is already reached before expiration of the dead time, when the electric motor drops below a predetermined residual speed.

17. The joint unit of claim 1, characterized in that a gearbox is provided behind the electric motor and the locking device.

18. A robot device, which comprises at least one joint unit according to claim 1.

19. A method for targeted braking of a joint device, having the following characteristics:
- an electric motor providing a relative motion between a joint drive side and a joint driven side,
- a motor control device, which is adapted for supplying energy to the electric motor or for extracting energy therefrom;
- a motor connection device, which is adapted for allowing, in the normal state, the energy exchange between the motor control device and the electric motor, without influencing the same, while permanently or pulsatingly short-circuiting the electric motor a short-circuit state,
- a mechanical functioning, electrically controllable locking device, which in a locking position without energy supply, blocks a relative motion between the joint drive side and the joint driven side, by form-fit, and which, in a release position, with energy supply, releases this relative motion,
- a control unit, which is adapted for controlling the motor control device, the motor connection device and the locking device depending on different operating states in such a way that the joint device may be stopped,
- a motor connection control unit, which is adapted for controlling the motor connection device and the locking device in different ways, so that the joint device may be stopped,
- the control unit comprises an operating state detecting device, which is connected with a number of sensor devices and which is adapted for detecting different operating states,
- wherein the joint device is adapted for obtaining its shutting down by following alternative methods:
- if the control unit in a first alternative does not detect any fault, then the motor control device is used for braking the electric motor,
- if the operating state detecting device detects faults outside of the control unit, in a second alternative, the control unit controls the motor control device for braking the electric motor and at a subsequent time, at the latest though after a predetermined dead time, it sets the locking device into the blocking position,
- if the motor connection control unit determines that the control unit is in a faulty condition, in a third alternative, the motor connection device is set into a short-circuit state and at a subsequent time, at the latest though after a predetermined dead time, it sets the locking device into the blocking position,
- if a power supply failure occurs, but cannot be detected, in a fourth alternative, the locking device is set into the blocking position, due to a lack of energy supply.

* * * * *